United States Patent
Wang et al.

(10) Patent No.: US 8,903,007 B2
(45) Date of Patent: Dec. 2, 2014

(54) METHOD AND APPARATUS FOR DETERMINING PRECODING MATRIX

(71) Applicant: Huawei Technologies Co., Ltd., Shenzhen (CN)

(72) Inventors: Rui Wang, Shenzhen (CN); Hao Yu, Shenzhen (CN); Kinnang Lau, Shenzhen (CN)

(73) Assignee: Huawei Technologies Co., Ltd., Shenzhen (CN)

( * ) Notice: Subject to any disclaimer, the term of this patent is extended or adjusted under 35 U.S.C. 154(b) by 0 days.

(21) Appl. No.: 13/974,604

(22) Filed: Aug. 23, 2013

(65) Prior Publication Data

US 2013/0343475 A1 Dec. 26, 2013

Related U.S. Application Data

(63) Continuation of application No. PCT/CN2011/078843, filed on Aug. 24, 2011.

(30) Foreign Application Priority Data

Feb. 24, 2011 (CN) .......................... 2011 1 0045361

(51) Int. Cl.
*H04B 7/02* (2006.01)
*H04L 25/03* (2006.01)
*H04B 7/04* (2006.01)

(52) U.S. Cl.
CPC ........ *H04B 7/0486* (2013.01); *H04L 25/03974* (2013.01)
USPC ........... 375/267; 375/299; 375/296; 375/254; 455/67.13

(58) Field of Classification Search
CPC ............ H04L 25/03949; H04B 7/0491; H04J 11/003; H03H 2218/06
USPC .......................................................... 375/267
See application file for complete search history.

(56) References Cited

U.S. PATENT DOCUMENTS 7,450,548 B2 * 11/2008 Haustein et al. ............... 370/334
7,839,835 B2  11/2010 Khojastepour et al.
(Continued)

FOREIGN PATENT DOCUMENTS

CN 101626266 A 1/2010
CN 101626353 A 1/2010
(Continued)

OTHER PUBLICATIONS

Arslan et al., "Equilibrium Efficiency Improvement in MIMO Interference Systems: A Decentralized Stream Control Approach" IEEE Transactions on Wireless Communications, vol. 6, No. 8, Aug. 2007, 10 pages.
(Continued)

*Primary Examiner* — Lihong Yu
(74) *Attorney, Agent, or Firm* — Brinks Gilson & Lione

(57) ABSTRACT

Embodiments of the present disclosure disclose a method and an apparatus for determining a precoding matrix, which relate to the field of communications technologies and may improve throughput of a MIMO system and optimize overall system performance, including: determining a rank constraint of a $j^{th}$ transmitting end, where $j=1, 2, \ldots, K$, and K is the total number of transmitting ends in a MIMO system; iteratively calculating an optimal precoding matrix of the $j^{th}$ transmitting end according to a channel matrix from the $j^{th}$ transmitting end to a $j^{th}$ receiving end, an autocorrelation matrix of interference and noise of the $j^{th}$ receiving end, and the rank constraint of the $j^{th}$ transmitting end, where the optimal precoding matrix maximizes channel capacity of a link from the $j^{th}$ transmitting end to the $j^{th}$ receiving end under a circumstance that precoding matrices of other transmitting ends do not change.

10 Claims, 5 Drawing Sheets

(56) References Cited

U.S. PATENT DOCUMENTS

2006/0193294 A1    8/2006    Jorswieck et al.
2007/0002734 A1    1/2007    Kim et al.
2011/0045782 A1*   2/2011    Shin et al. ................ 455/67.13

FOREIGN PATENT DOCUMENTS

CN        101784107 A    7/2010
CN        101895911 A    11/2010

OTHER PUBLICATIONS

Demirkol et al., "Power-Controlled Capacity for Interfering MIMO Links" 54$^{th}$ Vehicular Technology Conference, IEEE 2001, 5 pages.

Demirkol et al., "Control Using Capacity Constraints for Interfering MIMO Links"54$^{th}$ Vehicular Technology Conference, IEEE 2001, 5 pages.

Scutari et al., "Optimal Linear Precoding Strategies for Wideband Non-cooperative Systems Based on Game Theory—Part 1: Nash Equilibria" IEEE Transactions on Signal Processing, vol. 56, No. 3, Mar. 2008, 20 pages.

Scutari et al., "Optimal Linear Precoding Strategies for Wideband Non-cooperative Systems Based on Game Theory—Part II: Algorithms" IEEE Transactions on Signal Processing, vol. 56, No. 3, Mar. 2008, 18 pages.

* cited by examiner

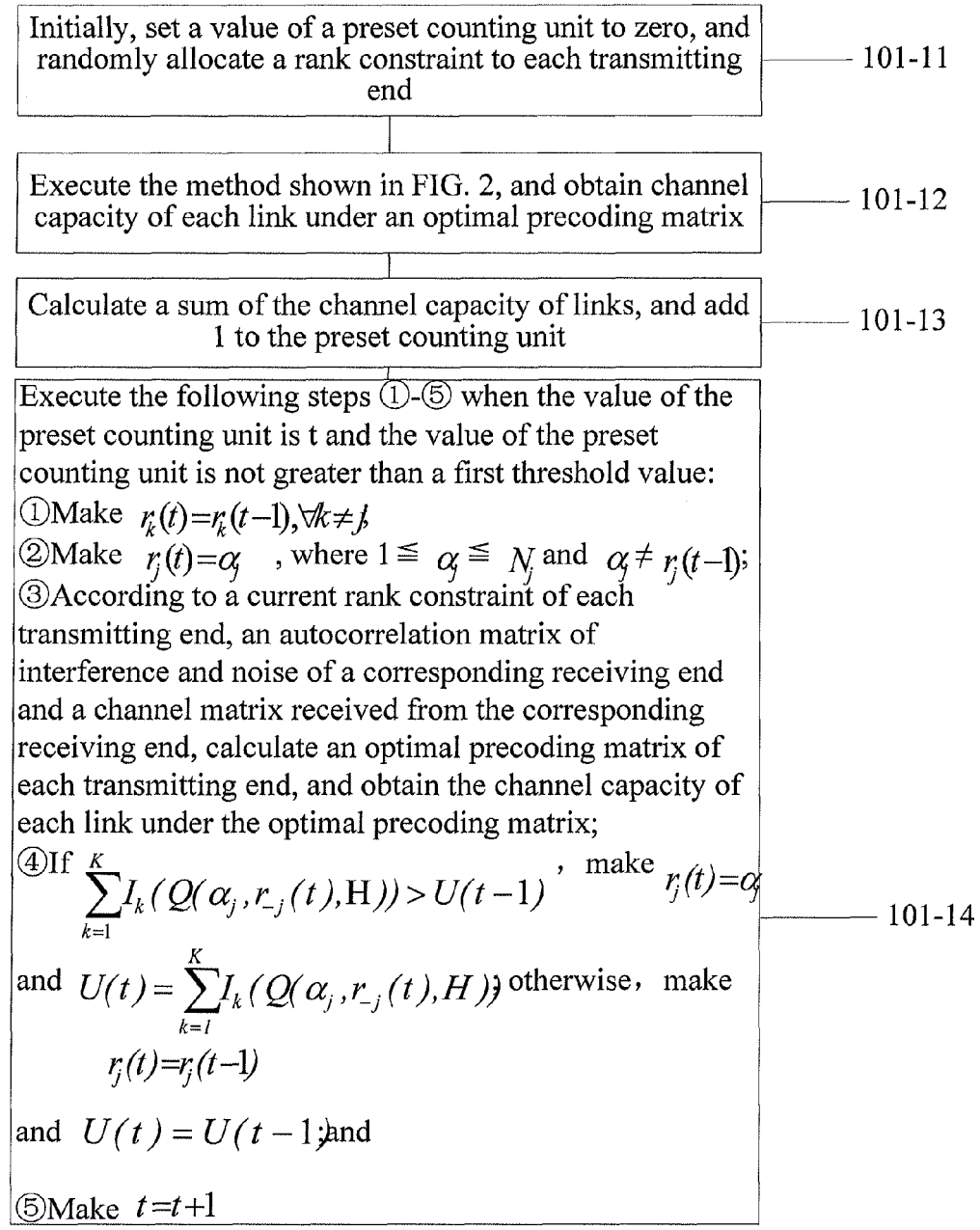

| Initially, set a value of a preset counting unit to zero, and randomly allocate a rank constraint to each transmitting end | — 101-11 |

| Execute the method shown in FIG. 2, and obtain channel capacity of each link under an optimal precoding matrix | — 101-12 |

| Calculate a sum of the channel capacity of links, and add 1 to the preset counting unit | — 101-13 |

Execute the following steps ①-⑤ when the value of the preset counting unit is t and the value of the preset counting unit is not greater than a first threshold value:

① Make $r_k(t)=r_k(t-1), \forall k \neq j$

② Make $r_j(t)=\alpha_j$, where $1 \leq \alpha_j \leq N_j$ and $\alpha_j \neq r_j(t-1)$;

③ According to a current rank constraint of each transmitting end, an autocorrelation matrix of interference and noise of a corresponding receiving end and a channel matrix received from the corresponding receiving end, calculate an optimal precoding matrix of each transmitting end, and obtain the channel capacity of each link under the optimal precoding matrix;

④ If $\sum_{k=1}^{K} I_k(Q(\alpha_j, r_{-j}(t)), H)) > U(t-1)$, make $r_j(t)=\alpha_j$ and $U(t) = \sum_{k=1}^{K} I_k(Q(\alpha_j, r_{-j}(t)), H))$ otherwise, make $r_j(t)=r_j(t-1)$ and $U(t) = U(t-1)$; and ⑤ Make $t=t+1$

METHOD AND APPARATUS FOR DETERMINING PRECODING MATRIX

CROSS-REFERENCE TO RELATED APPLICATIONS

This application is a continuation of International Application No. PCT/CN2011/078843, filed on Aug. 24, 2011, which claims priority to Chinese Patent Application No. 201110045361.4, filed on Feb. 24, 2011, both of which are hereby incorporated by reference in their entireties.

FIELD

The present disclosure relates to the field of communications technologies, and in particular, to a method and an apparatus for determining a precoding matrix.

BACKGROUND

In a Multiple-Input Multiple-Output (MIMO) system interference channel, a preferable precoding matrix generally needs to be selected for a transmitting end to improve performance of the system. The prior art provides a precoding matrix calculation method with manual rank reduction, which may calculate the preferable precoding matrix. Specific implementation steps are as follows.

1. In a MIMO system, each receiving end performs measurement and feeds back a channel matrix to a transmitting end corresponding to the receiving end. A constraint on the maximum number of data streams simultaneously transmitted is set at each transmitting end (the maximum number of data streams simultaneously transmitted is a rank of a precoding matrix), and a precoding matrix is initialized according to the constraint and the channel matrix.

2. In the MIMO system, each transmitting end updates its own precoding matrix in turn as follows: A certain transmitting end (hereinafter referred to as a first transmitting end) obtains an autocorrelation matrix of interference generated by another transmitting end at a receiving end (hereinafter referred to as a first receiving end) corresponding to it. The information may be measured by the first receiving end and fed back by the first receiving end to the first transmitting end. Then, the first transmitting end reduces a rank of a channel matrix of a signal link (hereinafter referred to as a first link) of itself according to the constraint of itself on the maximum number of data streams simultaneously transmitted, so that a rank of the channel matrix after rank reduction is not greater than the maximum number of data streams simultaneously transmitted. Finally, the first transmitting end calculates, according to the channel matrix after rank reduction and the autocorrelation matrix of interference, a precoding matrix for maximizing channel capacity of the first link, and transmits data by using the precoding matrix.

3. Updating in step 2 is executed on each transmitting end repeatedly until convergence (that is, there are few changes between a precoding matrix after updating and the precoding matrix before updating).

However, when the foregoing precoding matrix calculation method with manual rank reduction is adopted, rank reduction may be performed on an actual channel matrix to reduce mutual interference between different links, which improves the system performance to a certain extent, but the method cannot make full use of a spatial feature of the channel matrix, therefore, the obtained system performance is still poor.

SUMMARY

Embodiments of the present disclosure provide a method and an apparatus for determining a precoding matrix, which improve throughput of a MIMO system and optimize overall system performance.

In order to achieve the foregoing objectives, the embodiments of the present disclosure adopt the following solutions.

A method for determining a precoding matrix includes: determining a rank constraint of a $j^{th}$ transmitting end; and iteratively calculating an optimal precoding matrix of the $j^{th}$ transmitting end according to a channel matrix from the $j^{th}$ transmitting end to a $j^{th}$ receiving end, an autocorrelation matrix of interference and noise of the $j^{th}$ receiving end, and the rank constraint of the $j^{th}$ transmitting end, where the optimal precoding matrix maximizes channel capacity of a link from the $j^{th}$ transmitting end to the $j^{th}$ receiving end under a circumstance that precoding matrices of other transmitting ends do not change, $j=1, 2, \ldots, K$, and K is the total number of the transmitting ends or receiving ends in a MIMO system.

A communication apparatus includes: a determining unit, configured to determine a rank constraint of a $j^{th}$ transmitting end; and a calculating unit, configured to iteratively calculate an optimal precoding matrix of the $j^{th}$ transmitting end according to a channel matrix from the $j^{th}$ transmitting end to a $j^{th}$ receiving end, an autocorrelation matrix of interference and noise of the $j^{th}$ receiving end, and the rank constraint of the $j^{th}$ transmitting end, where the optimal precoding matrix maximizes channel capacity of a link from the $j^{th}$ transmitting end to the $j^{th}$ receiving end under a circumstance that precoding matrices of other transmitting ends do not change, $j=1, 2, \ldots, K$, and K is the total number of the transmitting ends or receiving ends in a MIMO system.

A communication system includes K transmitting ends and K receiving ends, where a $j^{th}$ transmitting end is configured to: determine a rank constraint of the $j^{th}$ transmitting end; and iteratively calculate an optimal precoding matrix of the $j^{th}$ transmitting end according to a channel matrix from the $j^{th}$ transmitting end to a $j^{th}$ receiving end, an autocorrelation matrix of interference and noise of the $j^{th}$ receiving end, and the rank constraint of the $j^{th}$ transmitting end, where the optimal precoding matrix maximizes channel capacity of a link from the $j^{th}$ transmitting end to the $j^{th}$ receiving end under a circumstance that precoding matrices of other transmitting ends do not change, $j=1, 2, \ldots, K$, and K is the total number of the transmitting ends or receiving ends in the communication system; and the $j^{th}$ receiving end is configured to receive data transmitted by the $j^{th}$ transmitting end using the optimal precoding matrix.

In the embodiments of the present disclosure described in the foregoing solutions, the $j^{th}$ transmitting end determines the rank constraint of the $j^{th}$ transmitting end, and iteratively calculates the optimal precoding matrix of the $j^{th}$ transmitting end according to the channel matrix from the $j^{th}$ transmitting end to the $j^{th}$ receiving end, the autocorrelation matrix of interference and noise of the $j^{th}$ receiving end, and the rank constraint of the $j^{th}$ transmitting end. It can be seen that, the precoding matrix of the transmitting end is obtained by calculation by using the rank constraint and the actual channel matrix from the $j^{th}$ transmitting end to the $j^{th}$ receiving end. Moreover, the optimal precoding matrix maximizes the channel capacity of the link from the $j^{th}$ transmitting end to the $j^{th}$ receiving end under the circumstance that the precoding matrices of other transmitting ends do not change. In comparison with the solution in the prior art that an optimal coding matrix is calculated by performing rank reduction on an actual channel matrix, when each transmitting end transmits data with the optimal coding matrix calculated through this solution, throughput of the MIMO system may be improved, and overall system performance may be optimized.

BRIEF DESCRIPTION OF THE DRAWINGS

To illustrate the solutions according to the embodiments of the present disclosure or in the prior art more clearly, accompanying drawings needed for describing the embodiments or the prior art are briefly introduced below. Obviously, the accompanying drawings in the following descriptions are merely some embodiments of the present disclosure, and persons of ordinary skill in the art may obtain other drawings according to the accompanying drawings without making creative efforts.

FIG. 3 is a flow chart of an implementation manner of step 101 in FIG. 1;

DETAILED DESCRIPTION OF THE EMBODIMENTS

The solutions of the embodiments of the present disclosure are clearly and completely described below with reference to the accompanying drawings in the embodiments of the present disclosure. Obviously, the described embodiments are merely part of rather than all of the embodiments of the present disclosure. All other embodiments obtained by persons of ordinary skill in the art based on the embodiments of the present disclosure without making creative efforts shall fall within the protection scope of the present disclosure.

Figure 1:
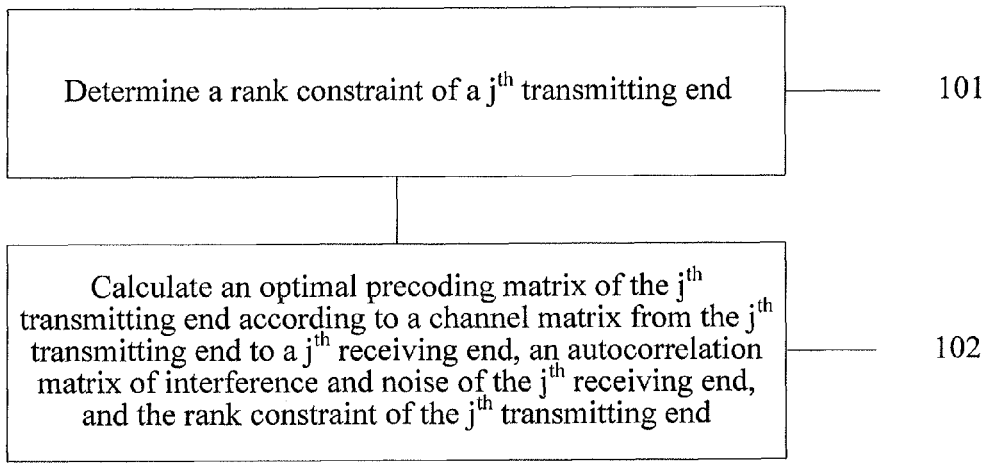
FIG. 1 is a flow chart of a method for determining a precoding matrix according to an embodiment of the present disclosure.

In an embodiment of the present disclosure, each transmitting end calculates its own precoding matrix. Taking that a $j^{th}$ transmitting end calculates its own precoding matrix as an example, a method for determining a precoding matrix is introduced in detail in the embodiment of the present disclosure. As shown in FIG. 1, the method includes:

101: Determine a rank constraint of a $j^{th}$ transmitting end.

An optimal precoding matrix of the $j^{th}$ transmitting end is iteratively calculated according to a channel matrix from the $j^{th}$ transmitting end to a $j^{th}$ receiving end, an autocorrelation matrix of interference and noise of the $j^{th}$ receiving end, and the rank constraint of the $j^{th}$ transmitting end, where the optimal precoding matrix maximizes channel capacity of a link from the $j^{th}$ transmitting end to the $j^{th}$ receiving end under a circumstance that precoding matrices of other transmitting ends do not change.

102: Iteratively calculate the optimal precoding matrix of the $j^{th}$ transmitting end according to the channel matrix from the $j^{th}$ transmitting end to the $j^{th}$ receiving end, the autocorrelation matrix of interference and noise of the $j^{th}$ receiving end, and the rank constraint of the $j^{th}$ transmitting end, where the optimal precoding matrix maximizes the channel capacity of the link from the $j^{th}$ transmitting end to the $j^{th}$ receiving end under the circumstance that the precoding matrices of other transmitting ends do not change. $j=1, 2, \ldots, K$, and K is the total number of the transmitting ends or receiving ends of in a MIMO system.

In the embodiment of the present disclosure, the precoding matrix of the transmitting end is calculated by using the rank constraint, the autocorrelation matrix of interference and noise of the $j^{th}$ receiving end, and the actual channel matrix from the $j^{th}$ transmitting end to the $j^{th}$ receiving end. Moreover, the optimal precoding matrix maximizes the channel capacity of the link from the $j^{th}$ transmitting end to the $j^{th}$ receiving end under the circumstance that the precoding matrices of other transmitting ends do not change. In comparison with the solution in the prior art that an optimal coding matrix is calculated by performing rank reduction on an actual channel matrix, when each transmitting end transmits data with the optimal coding matrix calculated by using this solution, a spatial feature of the channel matrix is fully used, throughput of the MIMO system may be improved, and overall system performance may be optimized.

Figure 2:
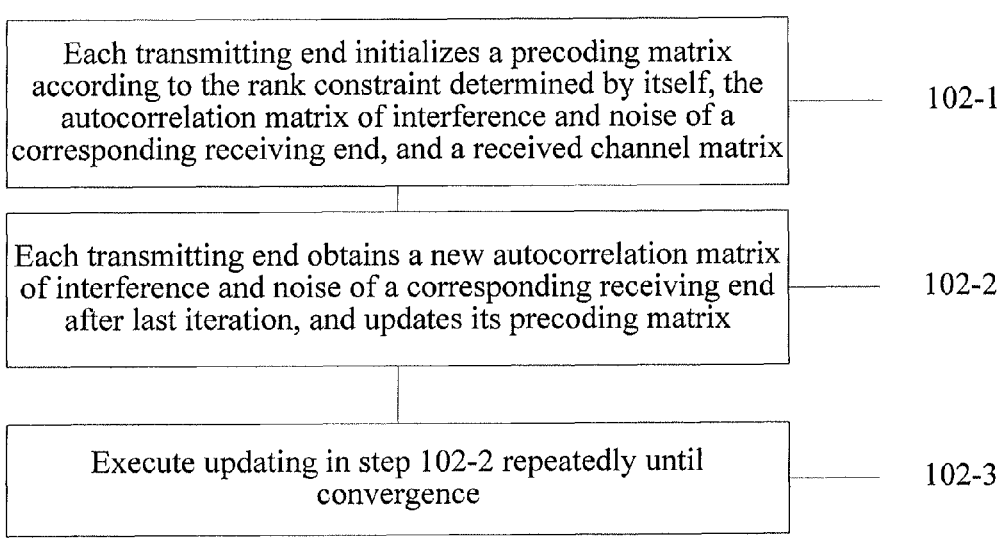
FIG. 2 is a flow chart of an implementation manner of step 102 in FIG. 1.

It should be noted that, in a specific application, when implementing the determining the rank constraint of the $j^{th}$ transmitting end, the foregoing step 101 needs to adopt the method for calculating the optimal precoding matrix of the transmitting end in step 102. For convenience of understanding, an implementation manner of step 102 is introduced first in the following. As shown in FIG. 2, the following sub-steps are included:

102-1: In the MIMO system, each receiving end performs measurement and feeds back the channel matrix to a transmitting end corresponding to it. Each transmitting end initializes a precoding matrix according to a rank constraint determined by it, the autocorrelation matrix of interference and noise of a corresponding receiving end, and a received channel matrix. For example, the $j^{th}$ transmitting end initializes the precoding matrix according to the determined rank constraint of the $j^{th}$ transmitting end, the autocorrelation matrix of interference and noise of the $j^{th}$ receiving end and the received channel matrix.

102-2: Each transmitting end obtains a new autocorrelation matrix of interference and noise of the corresponding receiving end after last iteration, and each updates the precoding matrix. For example, an updated precoding matrix of the $j^{th}$ transmitting end is a solution to the following preset optimization problem:

$$\max_{Q_j} \log \det(I + H_{jj}^H R_j^{-1} H_{jj} Q_j)$$

$$\text{subject to } Q_j \geq 0$$

$$\text{Rank}(Q_j) \leq r_j$$

$$\text{Trace}(Q_j) \leq P_j$$

where $\log \det(I+H_{jj}^H R_j^{-1} H_{jj} Q_j)$ denotes channel capacity of a link between the $j^{th}$ transmitting end and the $j^{th}$ receiving end. I denotes a unit matrix. $H_{jj}$ denotes a channel matrix from the $j^{th}$ transmitting end to the $j^{th}$ receiving end. $R_j$ denotes an autocorrelation matrix of interference and noise of the $j^{th}$ receiving end after a precoding matrix is iteratively updated last time. $Q_j=F_jF_j^H$, j=1, 2, ..., K. K is the total number of the transmitting ends. $Q_j$ is an autocorrelation matrix of a transmitting signal of the $j^{th}$ transmitting end. $F_j$ is a precoding matrix of the $j^{th}$ transmitting end. $r_j$ is a rank constraint of the $j^{th}$ transmitting end. Rank($Q_j$) denotes a rank of $Q_j$. $P_j$ is a transmitting power constraint of the $j^{th}$ transmitting end. Trace($Q_j$) denotes a trace of $Q_j$.

102-3: Execute the updating in step 102-2 repeatedly until convergence. An obtained optimal solution to the preset optimization problem satisfies a feature of a Nash equilibrium point.

The convergence refers to that, elements of a precoding matrix obtained by updating at a time is subtracted from corresponding elements of a precoding matrix obtained by updating adjacent to that time to obtain a difference matrix, and values obtained after a mod operation is performed on all the elements in the difference matrix are added to obtain a sum, and if the sum is smaller than a certain threshold, it indicates that the precoding matrix converges.

The Nash equilibrium point refers to that: the precoding matrices of other transmitting ends are given, when each transmitting end alone changes the precoding matrix, channel capacity of its signal link is not increased. Generally, a Nash equilibrium point is regarded as an optimal value of the precoding matrix.

It should be noted that, each transmitting end needs to execute the updating of the precoding matrix in the foregoing 102-2. The transmitting ends may perform the foregoing updating of the precoding matrices simultaneously, or perform the updating in turn according to a certain sequence. For example, if there are a transmitting end 1, a transmitting end 2 and a transmitting end 3, the sequence of updating of the precoding matrices of the transmitting ends may be: 1-2-3-1-2-3-1-2-3, ..., until iterative convergence. The present disclosure is not limited to the sequence of executing the updating of the precoding matrices by the transmitting ends.

It should be noted that, the foregoing optimization problem may have multiple optimal solutions. The embodiment of the present disclosure provides a closed-form expression of an optimal solution (that is, the optimal precoding matrix), including:

defining $A_j = H_{jj}^H R_j^{-1} H_{jj}$, where $A_j$ is a square matrix, and assume that its dimension is $N_j^t \times N_j^t$;

performing eigenvalue decomposition on $A_j$ to obtain $A_j = U_j \Lambda_j U_j^H$, where $U_j$ is a unitary matrix, $$\Lambda_j = \text{diag}\{\lambda_1(A_j), \lambda_2(A_j), \lambda_{s_j}(A_j), \underbrace{0, \ldots, 0}_{N_j^t - s_j \uparrow 0}\}$$

is a diagonal matrix, $\lambda_i(A_j)$ represents an $i^{th}$ eigenvalue of $A_j$, and $s_j$=Rank($H_{jj}$); and constructing an autocorrelation matrix $Q_j = U_j \Sigma_j U_j^H$, where is a diagonal matrix with a dimension of $N_j^t \times N_j^t$, and elements diag$\{\lambda_1(\Sigma_j), \lambda_2(\Sigma_j), \ldots, \lambda_{N_j^t}(\Sigma_j)\}$ on a diagonal line of $\Sigma_j$ satisfy:

$$\lambda_k(\sum_j) \begin{cases} \max\{\mu_j - \frac{1}{\lambda_k(A_j)}, 0\} & k = 1, 2, \ldots, \min\{s_j, r_j\} \\ 0 & k = \min\{s_j, r_j\} + 1, \ldots, N_j^t, \end{cases}$$

where selection of satisfies $$\sum_{k=1}^{\min\{s_j, r_j\}} \lambda_k(\sum_j) = P_j;$$

and $Q_j = F_j F_j^H$, j=1, 2, ..., K, K is the total number of the transmitting ends, and $F_j$ is a precoding matrix of the $j^{th}$ transmitting end.

Further, as shown in FIG. 3, the embodiment of the present disclosure provides an implementation manner of step 101. Determination of the rank constraint of the transmitting end may be completed within channel coherence time by using the implementation manner. The implementation manner requires a channel to keep unchanged or operate at a speed much faster than that of changing of the channel. Therefore, it is mainly adaptable to an application scenario where the channel changes slowly. In the embodiment of the present disclosure, the implementation manner is referred to as a short-term rank allocation manner, which specifically includes the following sub-steps:

101-11: Initially, set a value of a preset counting unit to zero, and randomly allocate a rank constraint to each transmitting end.

For example, t=0 is defined to denote the value of the preset counting unit initially. $r_i(0)$ is defined to denote a rank constraint of an $i^{th}$ transmitting end when t=0, i=1, 2, ..., K, and K is the total number of the transmitting ends in the MIMO system.

101-12: Execute the method shown in FIG. 2 to calculate an optimal precoding matrix of each transmitting end with a current channel matrix and the rank constraint allocated initially, and define H=$\{H_{jj}|i=1, \ldots, K; j=1, \ldots, K\}$ as a set of current channel matrices, where $H_{jj}$ denotes a channel matrix from the $j^{th}$ transmitting end to the $j^{th}$ receiving end.

Channel capacity of each link under the optimal precoding matrix is obtained, and channel capacity of a $k^{th}$ (k=1, 2, ..., K) link is defined to $I_k(Q(r(0),H))$.

101-13: Calculate a sum of the channel capacity of links, and add 1 to the preset counting unit.

For example, $$U(0) = \sum_{k=1}^{K} I_k(Q(r(0), H))$$

and t=t+1 are executed, where U(0) denotes a sum of link channel capacity when t=0.

101-14: Execute the following steps ①-⑤ when the value of the preset counting unit is t, and the value of the preset counting unit is not greater than a first threshold value:

① Keep rank constraints of all the transmitting ends except the jth transmitting end unchanged, where t is a nonzero positive integer.

Specifically, $r_k(t) = r_k(t-1)$, $\forall k \neq j$ may be executed, where $r_k(t)$ denotes a rank constraint of a $k^{th}$ transmitting end when the value of the preset counting unit is t. $r_k(t-1)$ denotes a rank constraint of the $k^{th}$ transmitting end when the value of the preset counting unit is t−1, and k=1, 2, . . . , K.

② Set the rank constraint of the $j^{th}$ transmitting end to a first preset value, define the first preset value as $\alpha_j$, where $1 \leq \alpha_j \leq N_j$ and $\alpha_j \neq r_j(t-1)$, $N_j$ denotes a rank of the channel matrix from the $j^{th}$ transmitting end to the $j^{th}$ receiving end, $r_j(t-1)$ denotes a rank constraint of the $j^{th}$ transmitting end when the value of the preset counting unit is t−1, and j=1, 2, . . . , K.

Specifically, $r_j(t)=\alpha_j$ may be executed, where $1 \leq \alpha_j \leq N_j$ and $\alpha_j \neq r_j(t-1)$, $r_j(t)$ denotes a rank constraint of the $j^{th}$ transmitting end when the value of the preset counting unit is t, $N_j$ denotes a rank of the channel matrix from the $j^{th}$ transmitting end to the $j^{th}$ receiving end, $r_j(t-1)$ denotes a rank constraint of the $j^{th}$ transmitting end when the value of the preset counting unit is t−1, and j=1, 2, . . . , K.

③ According to a current rank constraint of each transmitting end, an autocorrelation matrix of interference and noise of a corresponding receiving end, and a channel matrix received from the corresponding receiving end, calculate the optimal precoding matrix of each transmitting end, and obtain the channel capacity of links under optimal precoding matrices.

④ When a sum of the channel capacity of the links is greater than a corresponding sum of link channel capacity when the value of the preset counting unit is t−1, update the rank constraint of the $j^{th}$ transmitting end to the first preset value, and update the sum of the link channel capacity to the sum of the channel capacity of the links.

When the sum of the channel capacity of the links is not greater than the corresponding sum of the link channel capacity when the value of the preset counting unit is t−1, the rank constraint of the $j^{th}$ transmitting end is set to the corresponding rank constraint of the $j^{th}$ transmitting end when the value of the preset counting unit is t−1, and the sum of the link channel capacity is set to the corresponding sum of the link channel capacity when the value of the preset counting unit is t−1.

For example, specifically, if $$\sum_{k=1}^{K} I_k(Q(\alpha_j, r_{-j}(t), H)) > U(t-1),$$

make $r_j(t)=\alpha_j$ and $$U(t) = \sum_{k=1}^{K} I_k(Q(\alpha_j, r_{-j}(t), H));$$

otherwise, make $r_j(t)=(t-1)$ and $U(t)=U(t-1)$.

$I_k(Q(\alpha_j, r_{-j}(t), H))$ denotes channel capacity of a $k^{th}$ link corresponding to an optimal precoding matrix of the $k^{th}$ transmitting end, where k=1, 2, . . . , K. U(t) denotes a sum of channel capacity of all links when the value of the preset counting unit is t. U(t−1) denotes a sum of channel capacity of all the links when the value of the preset counting unit is t−1.

⑤ Add 1 to the value of the preset counting unit.

For example, specifically, t=t+1 is executed.

If the preset counting unit is greater than the first threshold value, the rank constraint of the $j^{th}$ transmitting end is output.

Figure 4:
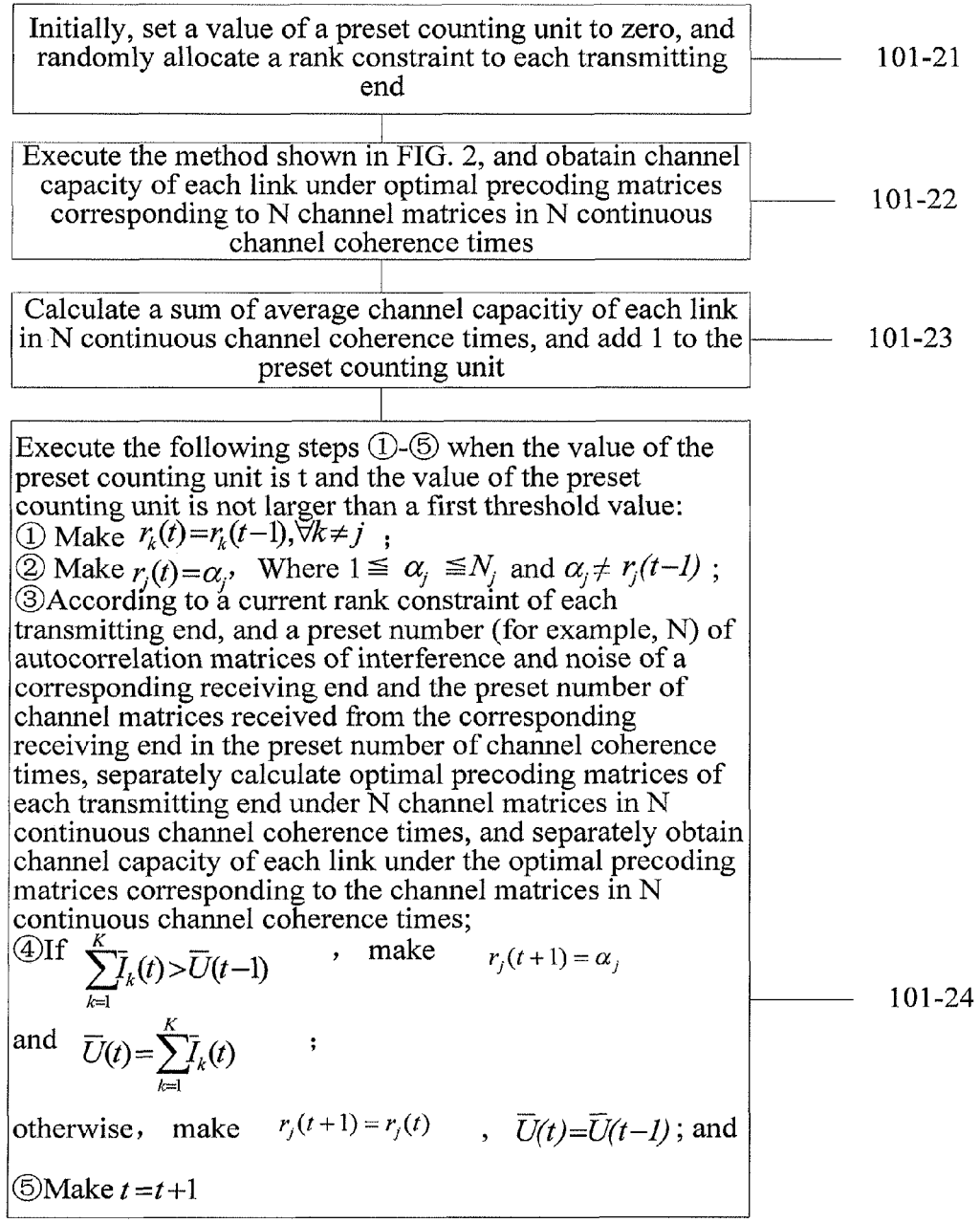
FIG. 4 is a flow chart of another implementation manner of step 101 in FIG. 1.

Further, as shown in FIG. 4, the embodiment of the present disclosure provides another implementation manner of step 101. By using the implementation manner, the determination of the rank constraint of the transmitting end may be completed within continuous multiple channel coherence times, and the rank constraint may also be predetermined through offline operation under a circumstance that a statistical characteristic of the channel is known. Therefore, the implementation manner may be applied to various scenarios. In the embodiment of the present disclosure, the implementation manner is referred to as a long-term rank allocation manner, which specifically includes the following sub-steps:

101-21: Initially, set a value of a preset counting unit to zero, and randomly allocate a rank constraint to each transmitting end.

For example, t=0 is defined to denote the value of the preset counting unit initially. $r_i(0)$ is defined to denote a rank constraint of an $i^{th}$ transmitting end when t=0, where i=1, 2, . . . , K, and K is the total number of the transmitting ends in the MIMO system.

101-22: In a preset number (defined to N) of continuous channel coherence times, execute the method shown in FIG. 2 N times, to calculate an optimal precoding matrix of each transmitting end under N channel matrices and the rank constraint allocated initially, in N continuous channel coherence times, and define $H(n)=\{H_{ij}(n)|i=1, \ldots, K; j=1, \ldots, K\}$, where (n=1, 2, . . . , N), to denote a set of the N channel matrices.

Channel capacity of each link under optimal precoding matrices corresponding to the N channel matrices in N continuous channel coherence times is obtained. $I_k(Q(r(0),H(n)))$ is defined to denote channel capacity of a $k^{th}$ link, where (k=1, 2, . . . , K), under a channel matrix H(n) when t=0.

Further, $$\bar{I}_k(0) = \frac{1}{N} \sum_{n=1}^{N} I_k(Q(r(0), H(n)))$$

is defined to denote average channel capacity of each link in N continuous channel coherence times when t=0, that is, an average value of the channel capacity of each link under the optimal precoding matrices corresponding to the channel matrices in N continuous channel coherence times.

101-23: Calculate a sum of the average channel capacity of links in the preset number of channel coherence times, and add 1 to the preset counting unit.

For example, $$\bar{U}(0) = \sum_{k=1}^{K} \bar{I}_k(0)$$

and t=t+1 are executed. $\bar{U}(0)$ denotes a sum of the average link channel capacity when t=0.

101-24: Execute the following steps ①-⑤ when the value of the preset counting unit is t, and the value of the preset counting unit is not greater than a first threshold value:

① Keep rank constraints of all the transmitting ends except the jth transmitting end unchanged, where t is a non-zero positive integer.

For example, specifically, make $r_k(t)=r_k(t-1)$, $\forall k \neq j$, where $r_k(t)$ denotes a rank constraint of a $k^{th}$ transmitting end when the value of the preset counting unit is t, $r_k(t-1)$ denotes a rank constraint of the $k^{th}$ transmitting end when the value of the preset counting unit is t−1, and k=1, 2, . . . , K.

② Set the rank constraint of the $j^{th}$ transmitting end to a first preset value, define the first preset value as $\alpha_j$, where $1 \leq \alpha_j \leq N_j$ and $\alpha_j \neq r_j(t-1)$, N denotes a rank of the channel matrix from the $j^{th}$ transmitting end to the $j^{th}$ receiving end, $r_j(t-1)$ denotes a rank constraint of the $j^{th}$ transmitting end when the value of the preset counting unit is t−1, and j=1, 2, . . . , K.

For example, specifically, make $r_j(t)=\alpha_j$, where $1 \leq \alpha_j \leq N_1$ and $\alpha_j \neq r_j(t-1)$, $r_j(t)$ denotes a rank constraint of the $j^{th}$ transmitting end when the value of the preset counting unit is t, $N_j$ denotes a rank of the channel matrix from the $j^{th}$ transmitting end to the $j^{th}$ receiving end, $r_j(t-1)$ denotes a rank constraint of the $j^{th}$ transmitting end when the value of the preset counting unit is t−1, and j=1, 2, . . . , K.

③ According to a current rank constraint of each transmitting end, and a preset number (for example, N) of auto-correlation matrices of interference and noise of a corresponding receiving end and the preset number of channel matrices, where the autocorrelation matrices and the channel matrices are received from the corresponding receiving end in the preset number of channel coherence time, separately calculate optimal precoding matrices of each transmitting end under N channel matrices in N continuous channel coherence times, and separately obtain the channel capacity of t links under the optimal precoding matrices corresponding to each channel matrices in N continuous channel coherence times.

④ When the sum of the average channel capacity of the links in the preset number of channel coherence times is greater than a corresponding sum of average link channel capacity when the value of the preset counting unit is t−1, update the rank constraint of the $j^{th}$ transmitting end to the first preset value, and update the sum of the average link channel capacity to the sum of the average channel capacity of the links in the preset number of channel coherence times. Average channel capacity of each link in the preset number of channel coherence times is an average value of the channel capacity of each link under the optimal precoding matrices corresponding to the channel matrices in the preset number of channel coherence times.

When the sum of the average channel capacity of the links in the preset number of channel coherence times is not greater than the corresponding sum of the average link channel capacity when the value of the preset counting unit is t−1, the rank constraint of the $j^{th}$ transmitting end is set to the corresponding rank constraint of the $j^{th}$ transmitting end when the value of the preset counting unit is t−1, and the sum of the average link channel capacity is set to the corresponding sum of the average link channel capacity when the value of the preset counting unit is t−1.

For example, specifically, if $$\sum_{k=1}^{K} \bar{I}_k(t) > \overline{U}(t-1),$$

make $r_j(t+1)=\alpha_j$ and $$\overline{U}(t) = \sum_{k=1}^{K} \bar{I}_k(t).$$

Otherwise, make $r_j(t+1)=r_j(t)$ and $\overline{U}(t)=\overline{U}(t-1)$.

$$\bar{I}_k(t) = \frac{1}{N} \sum_{n=tN+1}^{tN+N} I_k(Q(\alpha_j, r_{-j}(t), H(n))).$$

$$H(n) = \{H_{ij}(n) \mid i = 1, \ldots, K; j = 1, \ldots, K\}$$

denotes n preset channel matrices, where (n=tN+1, 2, . . . , tN+N). $I_k(Q(\alpha_j,r_{-j}(t),H(n)))$ denotes channel capacity of a $k^{th}$ link corresponding to the optimal precoding matrices of the $k^{th}$ transmitting end under the preset channel matrices in N continuous channel coherence times, where k=1, 2, . . . , K. $\overline{U}(t)$ denotes a sum of channel capacity of all links when the value of the preset counting unit is t. $\overline{U}(t-1)$ denotes a sum of channel capacity of all the links when the value of the preset counting unit is t−1.

⑤ Add 1 to the value of the preset counting unit.

For example, specifically, t=t+1 is executed.

If the preset counting unit is greater than the first threshold value, the rank constraint of the $j^{th}$ transmitting end is output.

Figure 5:
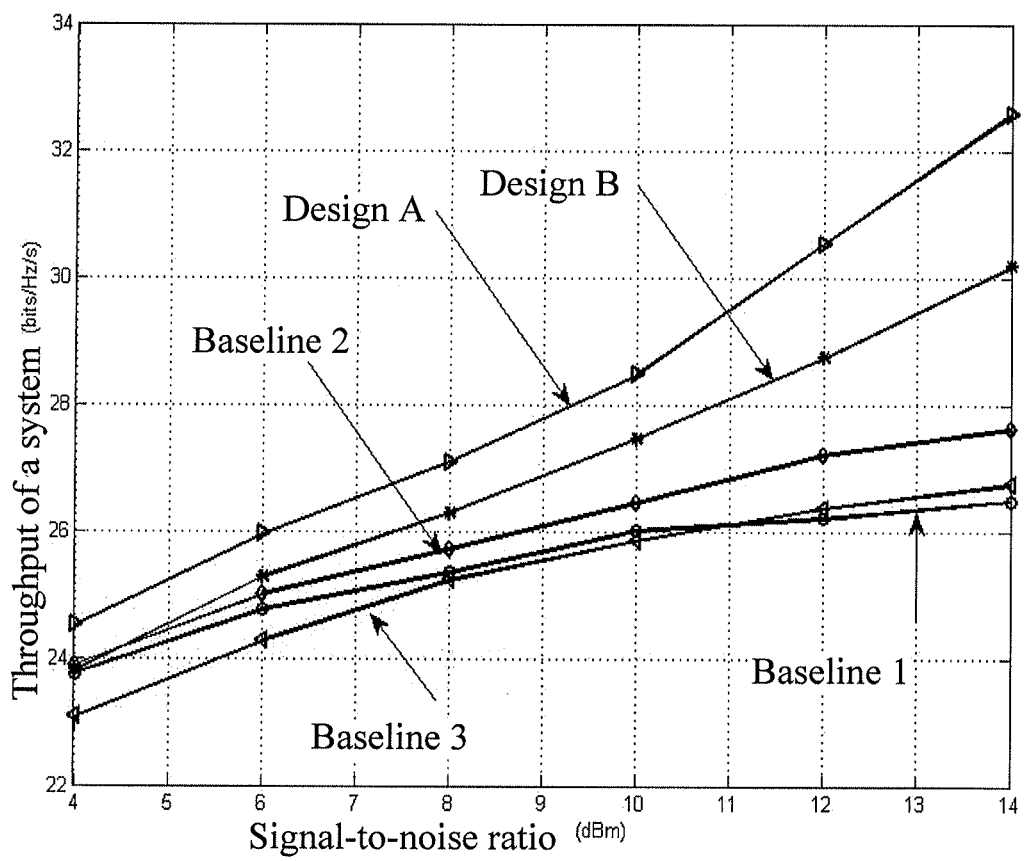
FIG. 5 is a schematic diagram of a simulation result according to an embodiment of the present disclosure.

To better verify an executing effect of the method for determining the precoding matrix provided in the embodiment of the present disclosure, a specific simulation experiment is given in the following. In the simulation experiment, four MIMO links are defined, and each transmitting end as well as each receiving end has five antennas. In a schematic diagram of a result of the simulation experiment shown in FIG. 5, a horizontal coordinate denotes a signal-to-noise ratio, and a vertical coordinate denotes throughput of the MIMO system.

A curve Baseline (baseline) 1 is a result obtained by adopting a rank allocation method without a rank constraint.

A curve Baseline 2 is a result obtained by adopting a rank allocation method with manual rank reduction (as described in the background of the disclosure).

A curve Baseline 3 is a result obtained by adopting the method shown in FIG. 2 according to the embodiment of the present disclosure plus a method for randomly allocating a rank constraint (that is, a rank constraint of each transmitting end is randomly generated).

A curve Design (design) A is a result obtained by adopting the method shown in FIG. 2 according to the embodiment of the present disclosure plus the short-term rank allocation method shown in FIG. 3.

A curve Design (design) B is a result obtained by adopting the method shown in FIG. 2 according to the embodiment of the present disclosure plus the long-term rank allocation method shown in FIG. 4.

It can be seen from the simulation result that, under a same signal-to-noise ratio, curves of the Design A and the Design B are better than the Baseline 1, the Baseline 2, and the Baseline 3, that is, through the method for determining the precoding matrix provided in the embodiment of the present disclosure, the throughput of the MIMO system is improved and the overall system performance is optimized.

Figure 6:
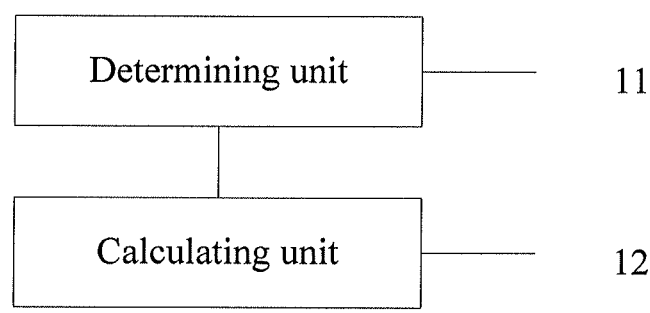
FIG. 6 is a structural diagram of a communication apparatus according to an embodiment of the present disclosure.

As shown in FIG. 6, an embodiment of the present disclosure further provides a communication apparatus, including: a determining unit 11 and a calculating unit 12.

The determining unit 11 is configured to determine a rank constraint of a $j^{th}$ transmitting end.

The calculating unit 12 is configured to iteratively calculate an optimal precoding matrix of the $j^{th}$ transmitting end according to a channel matrix from the $j^{th}$ transmitting end to a $j^{th}$ receiving end, an autocorrelation matrix of interference and noise of the $j^{th}$ receiving end, and the rank constraint of the $j^{th}$ transmitting end, where the optimal precoding matrix maximizes channel capacity of a link from the $j^{th}$ transmitting end to the $j^{th}$ receiving end under a circumstance that precoding matrices of other transmitting ends do not change, j=1, 2, ..., K, and K is the total number of the transmitting ends or receiving ends in a MIMO system.

The communication apparatus provided in the embodiment of the present disclosure determines the rank constraint of the $j^{th}$ transmitting end, and iteratively calculates the optimal precoding matrix of the $j^{th}$ transmitting end according to the channel matrix from the $j^{th}$ transmitting end to the $j^{th}$ receiving end, the autocorrelation matrix of interference and noise of the $j^{th}$ receiving end and the rank constraint of the $j^{th}$ transmitting end. It can be seen that, the precoding matrix of the transmitting end is calculated by using the rank constraint and the actual channel matrix from the $j^{th}$ transmitting end to the $j^{th}$ receiving end. Moreover, the optimal precoding matrix maximizes the channel capacity of the link from the $j^{th}$ transmitting end to the $j^{th}$ receiving end under the circumstance that the precoding matrices of the other transmitting ends do not change. In comparison with the solution in the prior art that an optimal coding matrix is calculated by performing rank reduction on an actual channel matrix, when each transmitting end transmits data by using the optimal coding matrix calculated through this solution, throughput of the MIMO system may be improved, and overall system performance may be optimized.

Specifically, the foregoing communication apparatus is a transmitting end in the MIMO system.

Figure 7:
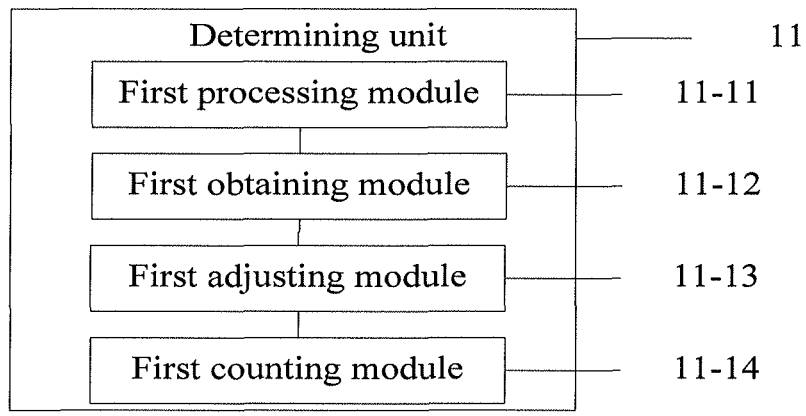
FIG. 7 is a structural diagram of a determining unit in a communication apparatus according to an embodiment of the present disclosure.

Further, optionally, as shown in FIG. 7, the determining unit 11 includes: a first processing module 11-11, a first obtaining module 11-12, a first adjusting module 11-13, and a first counting module 11-14.

The first processing module 11-11 is configured to: when a value of a preset counting unit is t and the value of the preset counting unit is not greater than a first threshold value, keep rank constraints of all the transmitting ends except the $j^{th}$ transmitting end unchanged, where t is a non-zero positive integer.

The first processing module 11-11 is further configured to set the rank constraint of the $j^{th}$ transmitting end to the first preset value, define the first preset value as $\alpha_j$, where $1 \leq \alpha_j \leq N_j$ and $\alpha_j \neq r_j(t-1)$, $N_j$ denotes a rank of the channel matrix from the $j^{th}$ transmitting end to the $j^{th}$ receiving end, and $r_j(t-1)$ denotes a rank constraint of the $j^{th}$ transmitting end when the value of the preset counting unit is t−1.

The first obtaining module 11-12 is configured to calculate, according to a current rank constraint of each transmitting end, an autocorrelation matrix of interference and noise of a corresponding receiving end, and a channel matrix received from the corresponding receiving end, an optimal precoding matrix of each transmitting end, and obtain channel capacity of links under optimal precoding matrices.

The first adjusting module 11-13 is configured to: when a sum of the channel capacity of the links is greater than a corresponding sum of link channel capacity when the value of the preset counting unit is t−1, update the rank constraint of the $j^{th}$ transmitting end to the first preset value, and update the sum of the link channel capacity to the sum of the channel capacity of the links.

The first adjusting module 11-13 is further configured to: when the sum of the channel capacity of the links is not greater than the corresponding sum of the link channel capacity when the value of the preset counting unit is t−1, set the rank constraint of the $j^{th}$ transmitting end to a corresponding rank constraint of the $j^{th}$ transmitting end when the value of the preset counting unit is t−1, and set the sum of the link channel capacity to the corresponding sum of the link channel capacity when the value of the preset counting unit is t−1.

The first counting module 11-14 is configured to add 1 to the value of the preset counting unit.

Figure 8:
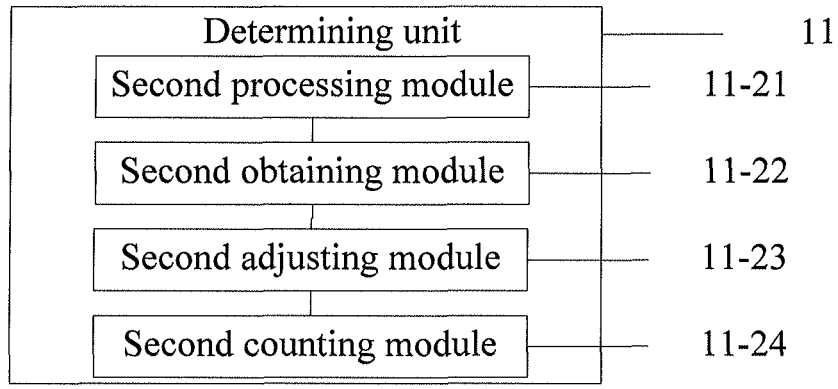
FIG. 8 is another structural diagram of a determining unit in a communication apparatus according to an embodiment of the present disclosure.

Further, optionally, as shown in FIG. 8, the determining unit 11 includes: a second processing module 11-21, a second obtaining module 11-22, a second adjusting module 11-23, and a second counting module 11-24.

The second processing module 11-21 is configured to: when the value of the preset counting unit is t and the value of the preset counting unit is not greater than the first threshold value, keep rank constraints of all the transmitting ends except the jth transmitting end unchanged, where t is a non-zero positive integer.

The second processing module 11-21 is further configured to set the rank constraint of the $j^{th}$ transmitting end to the first preset value, define the first preset value as $\alpha_j$, where $1 \leq \alpha_j \leq N_j$ and $\alpha_j \neq r_j(t-1)$, $N_j$ denotes a rank of the channel matrix from the $j^{th}$ transmitting end to the $j^{th}$ receiving end, $r_j(t-1)$ denotes a rank constraint of the $j^{th}$ transmitting end when the value of the preset counting unit is t−1, and j=1, 2, ..., K.

The second obtaining module 11-22 is configured to separately calculate, according to a current rank constraint of each transmitting end, and a preset number of autocorrelation matrices of interference and noise of a corresponding receiving end and the preset number of channel matrices received from the corresponding receiving end in the preset number of channel coherence times, optimal precoding matrices of each transmitting end under the preset number of the corresponding channel matrices in the preset number of channel coherence times, and separately obtain the channel capacity of each link under the optimal precoding matrices corresponding to the channel matrices in the preset number of channel coherence times.

The second adjusting module 11-23 is configured to: when a sum of average channel capacity of the links in the preset number of channel coherence times is greater than a corresponding sum of average link channel capacity when the value of the preset counting unit is t−1, update the rank constraint of the $j^{th}$ transmitting end to the first preset value, and update the sum of the average link channel capacity to the sum of the average channel capacity of the links in the preset number of channel coherence times; where the average channel capacity of each link is an average value of channel capacity of each link under the optimal precoding matrices corresponding to the channel matrices.

The second adjusting module 11-23 is further configured to: when the sum of the average channel capacity of the links in the preset number of channel coherence times is not greater than the corresponding sum of the average link channel capacity when the value of the preset counting unit is t−1, set the rank constraint of the $j^{th}$ transmitting end to the corresponding rank constraint of the $j^{th}$ transmitting end when the value of the preset counting unit is t−1, and set the sum of the average link channel capacity to the corresponding sum of the average link channel capacity when the value of the preset counting unit is t−1.

The second counting module 11-24 is configured to add 1 to the value of the preset counting unit.

Figure 9:
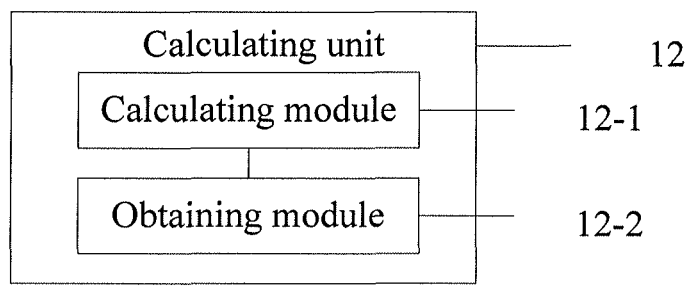
FIG. 9 is a structural diagram of a calculating unit in a communication apparatus according to an embodiment of the present disclosure.

Further, as shown in FIG. 9, the calculating unit 12 includes: a calculating module 12-1 and an obtaining module 12-2.

The calculating module 12-1 is configured to iteratively calculate a preset optimization problem.

The obtaining module 12-2 is configured to obtain a corresponding optimal solution when the preset optimization problem converges to a Nash equilibrium point during iterative calculation, where the optimal solution is the optimal precoding matrix of the $j^{th}$ transmitting end.

The preset optimization problem is $$\max_{Q_j} \log \det(I + H_{jj}^H R_j^{-1} H_{jj} Q_j)$$

subject to $$Q_j \geq 0$$

$$\text{Rank}(Q_j) \leq r_j$$

$$\text{Trace}(Q_j) \leq P_j.$$

$\log \det(I+H_{jj}^H R_j^{-1} H_{jj} Q_j)$ denotes channel capacity of a link between the $j^{th}$ transmitting end and the $j^{th}$ receiving end. I denotes a unit matrix. $H_{jj}$ denotes a channel matrix from the $j^{th}$ transmitting end to the $j^{th}$ receiving end. $R_j$ denotes an autocorrelation matrix of interference and noise of the $j^{th}$ receiving end after the precoding matrix is iteratively updated last time. $Q_j = F_j F_j^H$, $j=1, 2, \ldots, K$. K is the total number of the transmitting ends. $Q_j$ is an autocorrelation matrix of a transmitting signal of the $j^{th}$ transmitting end. $F_j$ is a precoding matrix of the $j^{th}$ transmitting end. $r_j$ is a rank constraint of the $j^{th}$ transmitting end. $\text{Rank}(Q_j)$ denotes a rank of $Q_j$. $P_j$ is a transmitting power constraint of the $j^{th}$ transmitting end. $\text{Trace}(Q_j)$ denotes a trace of $Q_j$.

It should be noted that, the foregoing optimization problem may have multiple optimal solutions. The embodiment of the present disclosure provides a closed-form expression of the optimal solution (that is, the optimal precoding matrix), including:

defining $A_j = H_{jj}^H R_j^{-1} H_{jj}$, where $A_j$ is a square matrix, and assume that its dimension is $N_j^t \times N_j^t$;

performing eigenvalue decomposition on $A_j$ to obtain $A_j = U_j \Lambda_j U_j^H$, where $U_j$ is a unitary matrix, $$\Lambda_j = \text{diag}\left\{\lambda_1(A_j), \lambda_2(A_j), \lambda_{s_j}(A_j), \underbrace{0, \ldots, 0}_{N_j^t - s_j \uparrow 0}\right\}$$

is a diagonal matrix, $\lambda_i(A_j)$ represents an $i^{th}$ eigenvalue of $A_j$, and $s_j = \text{Rank}(H_{jj})$; and constructing an autocorrelation matrix $Q_j = U_j \Sigma_j U_j^H$, where $\Sigma_j$ is a diagonal matrix with a dimension of $N_j^t \times N_j^t$, and elements $\text{diag}\{\lambda_1(\Sigma_j), \lambda_2(\Sigma_j), \ldots, \lambda_{N_j^t}(\Sigma_j)\}$ on a diagonal line of $\Sigma_j$ satisfy:

$$\lambda_k\left(\sum_j\right) = \begin{cases} \max\left\{\mu_j - \frac{1}{\lambda_k(A_j)}, 0\right\} & k = 1, 2, \ldots, \min\{s_j, r_j\} \\ 0 & k = \min\{s_j, r_j\} + 1, \ldots, N_j^t, \end{cases}$$

where selection of satisfies $$\sum_{k=1}^{\min\{s_j, r_j\}} \lambda_k\left(\sum_j\right) = P_j;$$

and $Q_j = F_j F_j^H$, $j=1, 2, \ldots, K$, K is the total number of the transmitting ends, and $F_j$ is a precoding matrix of the $j^{th}$ transmitting end.

Figure 10:
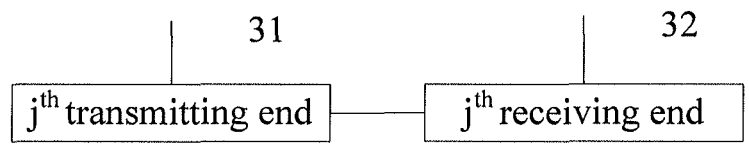
FIG. 10 is a structural diagram of a communication system according to an embodiment of the present disclosure.

As shown in FIG. 10, an embodiment of the present disclosure further provides a communication system, including: K transmitting ends 31 and K receiving ends 32;

A $j^{th}$ transmitting end 31 is configured to determine a rank constraint of a $j^{th}$ transmitting end; and iteratively calculate an optimal precoding matrix of the $j^{th}$ transmitting end according to a channel matrix from the $j^{th}$ transmitting end to a $j^{th}$ receiving end, an autocorrelation matrix of interference and noise of the $j^{th}$ receiving end, and the rank constraint of the $j^{th}$ transmitting end, where the optimal precoding matrix maximizes channel capacity of a link from the $j^{th}$ transmitting end to the $j^{th}$ receiving end under a circumstance that precoding matrices of other transmitting ends do not change, $j=1, 2, \ldots, K$, and K is the total number of the transmitting ends or receiving ends in a MIMO system.

The $j^{th}$ receiving end 32 is configured to receive data transmitted by the $j^{th}$ transmitting end using the optimal precoding matrix.

In the communication system provided in the embodiment of the present disclosure, the precoding matrix of the transmitting end is calculated by using the rank constraint and the actual channel matrix from the $j^{th}$ transmitting end to the $j^{th}$ receiving end. Moreover, the optimal precoding matrix maximizes the channel capacity of the link from the $j^{th}$ transmitting end to the $j^{th}$ receiving end under the circumstance that the precoding matrix of the transmitting end do not change. In comparison with the solution in the prior art that an optimal coding matrix is calculated by performing rank reduction on an actual channel matrix, when each transmitting end transmits data by using the optimal coding matrix calculated through this solution, throughput of the MIMO system may be improved, and overall system performance may be optimized.

The $j^{th}$ transmitting end 31 executes the following steps ☐-☐ when a value of a preset counting unit is t, and the value of the preset counting unit is not greater than a first threshold value:

① Keep rank constraints of all the transmitting ends except the jth transmitting end unchanged, where t is a non-zero positive integer.

② Set the rank constraint of the $j^{th}$ transmitting end to a first preset value, define the first preset value as $\alpha_j$, where $1 \leq \alpha_j \leq N_j$ and $\alpha_j \neq r_j(t-1)$, $N_j$ denotes a rank of the channel matrix from the $j^{th}$ transmitting end to the $j^{th}$ receiving end, $r_j(t-1)$ denotes a rank constraint of the $j^{th}$ transmitting end when the value of the preset counting unit is $t-1$, and $j=1, 2, \ldots, K$.

③ According to a current rank constraint of each transmitting end, an autocorrelation matrix of interference and noise of a corresponding receiving end, and a channel matrix received from the corresponding receiving end, calculate an optimal precoding matrix of each transmitting end, and obtain channel capacity of links under optimal precoding matrices.

④ When a sum of the channel capacity of the links is greater than a corresponding sum of link channel capacity when the value of the preset counting unit is $t-1$, update the rank constraint of the $j^{th}$ transmitting end to the first preset value, and update the sum of the link channel capacity to the sum of the channel capacity of the links.

When the sum of the channel capacity of the links is not greater than the corresponding sum of the link channel capacity when the value of the preset counting unit is $t-1$, the rank constraint of the $j^{th}$ transmitting end is set to the rank constraint of the $j^{th}$ transmitting end when the value of the preset counting unit is $t-1$, and the sum of the link channel capacity is set to the corresponding sum of the link channel capacity when the value of the preset counting unit is t−1.

⑤ Add 1 to the value of the preset counting unit.

The embodiments of the present disclosure are mainly applied to a procedure of calculating the precoding matrix. When each transmitting end adopts the solutions to calculate the optimal coding matrix to perform data transmission in the MIMO system, the throughput of the MIMO system may be improved, and the overall system performance may be optimized.

It should be noted that, persons of ordinary skill in the art may understand that all or part of processes in the methods of the foregoing embodiments may be implemented by a program instructing relevant hardware such as a hardware processor. The program may be stored in a computer readable storage medium that is accessible to the hardware processor. When the program is executed, the processes of the embodiments of the foregoing methods are included. The storage medium may be a magnetic disk, a compact disk, a read-only memory (Read-Only Memory, ROM), a random access memory (Read-Only Memory, RAM), and so on.

The foregoing descriptions are merely specific embodiments of the present disclosure, but not intended to limit the present disclosure. Any variation or replacement that may be easily thought of by persons skilled in the art without departing from the scope of the present disclosure shall fall within the protection scope of the present disclosure. Therefore, the protection scope of the present disclosure is subject to the protection scope of the claims.

What is claimed is:

1. A method for determining a precoding matrix, comprising:

determining, by a communication device, a rank constraint of a $j^{th}$ transmitting end; and calculating, by the communication device, iteratively an optimal precoding matrix of the $j^{th}$ transmitting end according to a channel matrix from the $j^{th}$ transmitting end to a $j^{th}$ receiving end, an autocorrelation matrix of interference and noise of the $j^{th}$ receiving end, and the rank constraint of the $j^{th}$ transmitting end, wherein the optimal precoding matrix maximizes channel capacity of a link from the $j^{th}$ transmitting end to the $j^{th}$ receiving end under a circumstance that precoding matrices of other transmitting ends do not change, $j=1, 2, \ldots, K$, and K is a total number of the transmitting ends or receiving ends in a Multiple-Input Multiple-Output (MIMO) system;

wherein the calculating iteratively the optimal precoding matrix of the $j^{th}$ transmitting end according to the channel matrix from the $j^{th}$ transmitting end to the $j^{th}$ receiving end, the autocorrelation matrix of interference and noise of the $j^{th}$ receiving end and the rank constraint of the $j^{th}$ transmitting end comprises:

calculating iteratively a preset optimization problem; and obtaining a corresponding optimal solution when the preset optimization problem converges to a Nash equilibrium point during iterative calculation, wherein the optimal solution is the optimal precoding matrix of the $j^{th}$ transmitting end, wherein the preset optimization problem is $$\max_{Q_j} \log\det(I + H_{jj}^H R_j^{-1} H_{jj} Q_j)$$

subject to $$Q_j \geq 0$$

$$\text{Rank}(Q_j) \leq r_j$$

$$\text{Trace}(Q_j) \leq P_j,$$

wherein $\log\det(I + H_{jj}^H R_j^{-1} H_{jj} Q_j)$ denotes channel capacity of a link between the $j^{th}$ transmitting end and the $j^{th}$ receiving end, I denotes a unit matrix, $H_{jj}$ denotes a channel matrix from the $j^{th}$ transmitting end to the $j^{th}$ receiving end, $R_j$ denotes an autocorrelation matrix of interference and noise of the $j^{th}$ receiving end after the precoding matrix is iteratively updated last time, $Q_j = F_j F_j^H$, $j=1, 2, \ldots, K$, K is the total number of the transmitting ends, $Q_j$ is an autocorrelation matrix of a transmitting signal of the $j^{th}$ transmitting end, $F_j$ is a precoding matrix of the $j^{th}$ transmitting end, $r_j$ is a rank constraint of the $j^{th}$ transmitting end, $\text{Rank}(Q_j)$ denotes a rank of $Q_j$, $P_j$ is a transmitting power constraint of the $j^{th}$ transmitting end, and $\text{Trace}(Q_j)$ denotes a trace of $Q_j$.

2. The method according to claim 1, wherein determining the rank constraint of the $j^{th}$ transmitting end comprises:

executing the following steps ①-⑤ when a value of a preset counting unit is t and the value of the preset counting unit is not greater than a first threshold value:

① keep rank constraints of all the transmitting ends except the $j^{th}$ transmitting end unchanged, wherein t is a nonzero positive integer;

② setting the rank constraint of the $j^{th}$ transmitting end to a first preset value, define the first preset value as $\alpha_j$, wherein $1 \leq \alpha_j \leq N_j$ and $\alpha_j \neq r_j(t-1)$, $N_j$ denotes a rank of the channel matrix from the $j^{th}$ transmitting end to the $j^{th}$ receiving end, $r_j(t-1)$ denotes a rank constraint of the $j^{th}$ transmitting end when the value of the preset counting unit is t−1, and $j=1, 2, \ldots, K$;

③ calculating, according to a current rank constraint of each transmitting end, an autocorrelation matrix of interference and noise of a corresponding receiving end, and a channel matrix received from the corresponding receiving end, an optimal precoding matrix of each transmitting end, and obtaining channel capacity of links under optimal precoding matrices;

④ when a sum of the channel capacity of the links is greater than a corresponding sum of link channel capacity when the value of the preset counting unit is t−1, updating the rank constraint of the $j^{th}$ transmitting end to the first preset value, and updating the sum of the link channel capacity to the sum of the channel capacity of the links, and when the sum of the channel capacity of the links is not greater than the corresponding sum of the link channel capacity when the value of the preset counting unit is t−1, setting the rank constraint of the $j^{th}$ transmitting end to the corresponding rank constraint of the $j^{th}$ transmitting end when the value of the preset counting unit is t−1, and setting the sum of the link channel capacity to the corresponding sum of the link channel capacity when the value of the preset counting unit is t−1; and ⑤ adding 1 to the value of the preset counting unit.

3. The method according to claim 1, wherein the determining the rank constraint of the $j^{th}$ transmitting end comprises:

executing the following steps ①-⑤ when a value of a preset counting unit is t and the value of the preset counting unit is not greater than a first threshold value:

① not changing rank constraints of all the transmitting ends except the $j^{th}$ transmitting end, wherein t is a non-zero positive integer;

② setting the rank constraint of the $j^{th}$ transmitting end to a first preset value, defining the first preset value as $\alpha_j$, wherein $1 \leq \alpha_j \leq N_j$ and $\alpha_j \oplus r_j(t-1)$, $N_j$ denotes a rank of the channel matrix from the $j^{th}$ transmitting end to the $j^{th}$ receiving end, $r_j(t-1)$ denotes a rank constraint of the $j^{th}$ transmitting end when the value of the preset counting unit is $t-1$, and $j=1, 2, \ldots, K$;

③ separately calculating, according to a current rank constraint of each transmitting end, and a preset number of autocorrelation matrices of interference and noise of a corresponding receiving end and the preset number of channel matrices received from the corresponding receiving end in the preset number of channel coherence times, optimal precoding matrices of each transmitting end under the preset number of the corresponding channel matrices in the preset number of channel coherence times, and separately obtaining channel capacity of links under the optimal precoding matrices corresponding to the channel matrices in the preset number of channel coherence times;

④ when a sum of average channel capacity of the links in a preset number of channel coherence times is greater than a corresponding sum of average link channel capacity when the value of the preset counting unit is $t-1$, updating the rank constraint of the $j^{th}$ transmitting end to the first preset value, and updating the sum of average link channel capacity to the sum of the average channel capacity of the links in the preset number of channel coherence times, wherein average channel capacity of each link in the preset number of channel coherence times is an average value of the channel capacity of each link under the optimal precoding matrices corresponding to the channel matrices in the preset number of channel coherence times, and when the sum of the average channel capacity of the links in the preset number of channel coherence times is not greater than the corresponding sum of the average link channel capacity when the value of the preset counting unit is $t-1$, setting the rank constraint of the $j^{th}$ transmitting end to the corresponding rank constraint of the $j^{th}$ transmitting end when the value of the preset counting unit is $t-1$, and setting the sum of the average link channel capacity to the corresponding sum of the average link channel capacity when the value of the preset counting unit is $t-1$; and ⑤ adding 1 to the value of the preset counting unit.

4. The method according to claim 1, wherein a closed-form expression of the optimal precoding matrix comprises:

defining $A_j = H_{hh}{}^H R_j^{-1} H_{jj}$, wherein $A_j$ is a square matrix, and assume that its dimension is $N_j^t \times N_j^t$;

performing eigenvalue decomposition on $A_j$ to obtain $A_j = U_j \Lambda_j U_j^H$, wherein $U_j$ is a unitary matrix, $$\Lambda_j = \text{diag}\{\lambda_1(A_j), \lambda_2(A_j), \lambda_{s_j}(A_j), \underbrace{0, \ldots, 0}_{N_j^t - s_j \uparrow 0}\}$$

is a diagonal matrix, $\lambda_y(A_j)$ represents an $i^{th}$ eigenvalue of $A_j$, and $s_j = \text{Rank}(H_{jj})$; and constructing an autocorrelation matrix $Q_j = U_j \Sigma_j U_j^H$, wherein $\Sigma_j$ is a diagonal matrix with a dimension of $N_j^t \times N_j^t$, and elements diag $\{\lambda_1(\Sigma_j), \lambda_2(\Sigma_j), \ldots, \lambda_{N_j^t}(\Sigma_j)\}$ on a diagonal line of $\Sigma_j$ satisfy:

$$\lambda_k(\sum_j) = \begin{cases} \max\left\{\mu_j - \frac{1}{\lambda_k(A_j)}, 0\right\} & k = 1, 2, \ldots, \min\{s_j, r_j\} \\ 0 & k = \min\{s_j, r_j\} + 1, \ldots, N_j^t, \end{cases}$$

wherein selection of satisfies $$\sum_{k=1}^{\min\{s_j, r_j\}} \lambda_k(\sum_j) = P_j;$$

and $Q_j = F_j F_j^H$, $j=1, 2, \ldots, K$, K is the total number of the transmitting ends, and $F_j$ is a precoding matrix of the $j^{th}$ transmitting end.

5. A communication apparatus having a processor and a non-transitory storage medium accessible to the processor, the non-transitory storage medium configured to store:

a determining unit, configured to determine a rank constraint of a $j^{th}$ transmitting end, wherein $j=1, 2, \ldots, K$, and K is the total number of transmitting ends in a Multiple-Input Multiple-Output (MIMO) system; and a calculating unit, configured to calculate iteratively an optimal precoding matrix of the $j^{th}$ transmitting end according to a channel matrix from the $j^{th}$ transmitting end to a $j^{th}$ receiving end, an autocorrelation matrix of interference and noise of the $j^{th}$ receiving end, and the rank constraint of the $j^{th}$ transmitting end, wherein the optimal precoding matrix maximizes channel capacity of a link from the $j^{th}$ transmitting end to the $j^{th}$ receiving end under a circumstance that precoding matrices of other transmitting ends do not change, $j=1, 2, \ldots, K$, and K is the total number of the transmitting ends or receiving ends in the MIMO system;

wherein the calculating unit comprises:

a calculating module, configured to calculate iteratively a preset optimization problem; and an obtaining module, configured to obtain a corresponding optimal solution when the preset optimization problem converges to a Nash equilibrium point during iterative calculation, wherein the optimal solution is the optimal precoding matrix of the jth transmitting end, wherein the preset optimization problem is $$\max_{Q_j} \log \det(I + H_{jj}^H R_j^{-1} H_{jj} Q_j)$$

subject to $$Q_j \geq 0$$

$$\text{Rank}(Q_j) \leq r_j$$

$$\text{Trace}(Q_j) \leq P_j,$$

wherein $\log \det(I + H_{jj}^H R_j^{-1} H_{jj} Q_j)$ denotes channel capacity of a link between the transmitting end and the $j^{th}$ receiving end, I denotes a unit matrix, $H_{jj}$ denotes a channel matrix from the $j^{th}$ transmitting end to the $j^{th}$ receiving end, $R_j$ denotes an autocorrelation matrix of interference and noise of the $j^{th}$ receiving end after the precoding matrix is iteratively updated last time, $Q_j=F_jF_j^H$, j=1, 2, ..., K, K is the total number of the transmitting ends, $Q_j$ is an autocorrelation matrix of a transmitting signal of the $j^{th}$ transmitting end, $F_j$ is a precoding matrix of the $j^{th}$ transmitting end, $r_j$ is a rank constraint of the $j^{th}$ transmitting end, Rank($Q_j$) denotes a rank of $Q_j$, $P_j$ is a transmitting power constraint of the $j^{th}$ transmitting end, and Trace($Q_j$) denotes a trace of $Q_j$.

6. The communication apparatus according to claim 5, wherein the determining unit comprises:

a first processing module, configured to: keep rank constraints of all the transmitting ends except the jth transmitting end unchanged when a value of a preset counting unit is t and the value of the preset counting unit is not greater than a first threshold value, wherein t is a non-zero positive integer, and the first processing module is further configured to set the rank constraint of the $j^{th}$ transmitting end to a first preset value, define the first preset value as $\alpha_j$, wherein $1 \leq \alpha_j \leq N_j$ and $\alpha_j \neq r_j(t-1)$, $N_j$ denotes a rank of the channel matrix from the $j^{th}$ transmitting end to the $j^{th}$ receiving end, and $r_j(t-1)$ denotes a rank constraint of the $j^{th}$ transmitting end when the value of the preset counting unit is t−1;

a first obtaining module, configured to calculate, according to a current rank constraint of each transmitting end, an autocorrelation matrix of interference and noise of a corresponding receiving end, and a channel matrix received from the corresponding receiving end, an optimal precoding matrix of each transmitting end, and obtain channel capacity of links under optimal precoding matrices;

a first adjusting module, configured to: when a sum of the channel capacity of the links is greater than a corresponding sum of link channel capacity when the value of the preset counting unit is t−1, update the rank constraint of the $j^{th}$ transmitting end to the first preset value, and update the sum of the link channel capacity to the sum of the channel capacity of the links, wherein the first adjusting module is further configured to: when the sum of the channel capacity of the links is not greater than the corresponding sum of the link channel capacity when the value of the preset counting unit is t−1, set the rank constraint of the $j^{th}$ transmitting end to the corresponding rank constraint of the $j^{th}$ transmitting end when the value of the preset counting unit is t−1, and set the sum of the link channel capacity to the corresponding sum of the link channel capacity when the value of the preset counting unit is t−1; and a first counting module, configured to add 1 to the value of the preset counting unit.

7. The communication apparatus according to claim 5, wherein the determining unit comprises:

a second processing module, configured to: keep rank constraints of all the transmitting ends except the jth transmitting end unchanged when a value of a preset counting unit is t and the value of the preset counting unit is not greater than a first threshold value, wherein t is a non-zero positive integer, and the second processing module is further configured to set the rank constraint of the $j^{th}$ transmitting end to a first preset value, define the first preset value as $\alpha_j$, wherein $1 \leq \alpha_j \leq N_j$ and $\alpha_j \neq r_j(t-1)$, $N_j$ denotes a rank of the channel matrix from the $j^{th}$ transmitting end to the $j^{th}$ receiving end, $r_j(t-1)$ denotes a rank constraint of the $j^{th}$ transmitting end when the value of the preset counting unit is t−1, and j=1, 2, ..., K;

a second obtaining module, configured to separately calculate, according to a current rank constraint of each transmitting end, and a preset number of autocorrelation matrices of interference and noise of a corresponding receiving end and the preset number of channel matrices received from the corresponding receiving end in the preset number of channel coherence times, optimal precoding matrices of each transmitting end under the preset number of the corresponding channel matrices in the preset number of channel coherence times, and separately obtain channel capacity of links under the optimal precoding matrices corresponding to the channel matrices in the preset number of channel coherence times;

a second adjusting module, configured to: when a sum of average channel capacity of the links in the preset number of channel coherence times is greater than a corresponding sum of average link channel capacity when the value of the preset counting unit is t−1, update the rank constraint of the $j^{th}$ transmitting end to the first preset value, and update the sum of the average link channel capacity to the sum of the average channel capacity of the links in the preset number of channel coherence times, wherein an average channel capacity of each link in the preset number of channel coherence times is an average value of the channel capacity of the links under the optimal precoding matrices corresponding to the channel matrices in the preset number of channel coherence times, and the second adjusting module is further configured to: when the sum of the average channel capacity of the links in the preset number of channel coherence times is not greater than the corresponding sum of the average link channel capacity when the value of the preset counting unit is t−1, set the rank constraint of the $j^{th}$ transmitting end to the corresponding rank constraint of the $j^{th}$ transmitting end when the value of the preset counting unit is t−1, and set the sum of the average link channel capacity to the corresponding sum of the average link channel capacity when the value of the preset counting unit is t−1; and a second counting module, configured to add 1 to the value of the preset counting unit.

8. The communication apparatus according to claim 5, wherein a closed-form expression of the optimal precoding matrix comprises:

defining $A_j = H_{jj}^H R_j^{-1} H_{jj}$, wherein $A_j$ is a square matrix, and assume that its dimension is $N_j^r \times N_j^r$;

performing eigenvalue decomposition on $A_j$ to obtain $A_j = U_j \Lambda_j U_j^H$, wherein $U_j$ is a unitary matrix, $$\Lambda_j = \text{diag}\{\lambda_1(A_j), \lambda_2(A_j), \lambda_{s_j}(A_j), \underbrace{0, \ldots, 0}_{N_j^r - s_j \uparrow 0}\}$$

is a diagonal matrix, $\lambda_i(A_j)$ represents an $i^{th}$ eigenvalue of $A_j$, and $s_j = \text{Rank}(H_{jj})$; and constructing an autocorrelation matrix $Q_j = U_j \Sigma_j U_j^H$, wherein $\Sigma_j$ is a diagonal matrix with a dimension of $N_j^t \times N_j^t$, and elements diag$\{\lambda_1(\Sigma_j), \lambda_2(\Sigma_j), \ldots, \lambda_{N_j^t}(\Sigma_j)\}$ on a diagonal line of $\Sigma_j$ satisfy:

$$\lambda_k(\sum_j) = \begin{cases} \max\left\{\mu_j - \frac{1}{\lambda_k(A_j)}, 0\right\} & k = 1, 2, \ldots, \min\{s_j, r_j\} \\ 0 & k = \min\{s_j, r_j\} + 1, \ldots, N_j^t, \end{cases}$$

wherein selection of $\mu_j$ satisfies $$\sum_{k=1}^{\min\{s_j, r_j\}} \lambda_k(\sum_j) = P_j;$$

and
$Q_j = F_j F_j^H$, j=1, 2, . . . , K, K is the total number of the transmitting ends, and $F_j$ is a precoding matrix of the $j^{th}$ transmitting end.

9. A communication system, comprising K transmitting ends and K receiving ends, wherein
a $j^{th}$ transmitting end is configured to: determine a rank constraint of the $j^{th}$ transmitting end; and iteratively calculate an optimal precoding matrix of the jth transmitting end according to a channel matrix from the $j^{th}$ transmitting end to a $j^{th}$ receiving end, an autocorrelation matrix of interference and noise of the $j^{th}$ receiving end, and the rank constraint of the $j^{th}$ transmitting end, wherein the optimal precoding matrix maximizes channel capacity of a link from the $j^{th}$ transmitting end to the $j^{th}$ receiving end under a circumstance that precoding matrices of other transmitting ends do not change, j=1, 2, . . . , K, and K is an integer representing a total number of the transmitting ends or receiving ends in the communication system; and
the $j^{th}$ receiving end is configured to receive data transmitted by the $j^{th}$ transmitting end using the optimal precoding matrix;
and the $j^{th}$ transmitting end is configured to:
calculate iteratively a preset optimization problem; and
obtain a corresponding optimal solution when the preset optimization problem converges to a Nash equilibrium point during iterative calculation, wherein the optimal solution is the optimal precoding matrix of the $j^{th}$ transmitting end, wherein
the preset optimization problem is $$\max_{Q_j} \log \det(I + H_{jj}^H R_j^{-1} H_{jj} Q_j)$$

subject to $$Q_j \geq 0$$

$$\text{Rank}(Q_j) \leq r_j$$

$$\text{Trace}(Q_j) \leq P_j,$$

wherein log det($I + H_{jj}^H R_j^{-1} H_{jj} Q_j$) denotes channel capacity of a link between the $j^{th}$ transmitting end and the $j^{th}$ receiving end, I denotes a unit matrix, $H_{jj}$ denotes a channel matrix from the $j^{th}$ transmitting end to the $j^{th}$ receiving end, $R_j$ denotes an autocorrelation matrix of interference and noise of the $j^{th}$ receiving end after the precoding matrix is iteratively updated last time, $Q_j = F_j F_j^H$, j=1, 2, . . . , K, K is the total number of the transmitting ends, $Q_j$ is an autocorrelation matrix of a transmitting signal of the $j^{th}$ transmitting end, $F_j$ is a precoding matrix of the $j^{th}$ transmitting end, $r_j$ is a rank constraint of the $j^{th}$ transmitting end, Rank($Q_j$) denotes a rank of $Q_j$, $P_j$ is a transmitting power constraint of the $j^{th}$ transmitting end, and Trace($Q_j$) denotes a trace of $Q_j$.

10. The communication system according to claim 9, wherein the $j^{th}$ transmitting end executes the following steps ①-⑤ when a value of a preset counting unit is t and the value of the preset counting unit is not greater than a first threshold value:
① keep rank constraints of all the transmitting ends except the $j^{th}$ transmitting end unchanged, wherein t is a non-zero positive integer;
② setting the rank constraint of the $j^{th}$ transmitting end to a first preset value, defining the first preset value as $\alpha_j$, wherein $1 \leq \alpha_j \leq N_j$ and $\alpha_j \neq r_j(t-1)$, $N_j$ denotes a rank of the channel matrix from the $j^{th}$ transmitting end to the $j^{th}$ receiving end, and $r_j(t-1)$ denotes a rank constraint of the $j^{th}$ transmitting end when the value of the preset counting unit is t−1, and j=1, 2, . . . , K;
③ calculating, according to a current rank constraint of each transmitting end, an autocorrelation matrix of interference and noise of a corresponding receiving end, and a channel matrix received from the corresponding receiving end, an optimal precoding matrix of each transmitting end, and obtaining channel capacity of links under optimal precoding matrices;
④ when a sum of the channel capacity of the links is greater than a corresponding sum of link channel capacity when the value of the preset counting unit is t−1, updating the rank constraint of the $j^{th}$ transmitting end to the first preset value, and updating the sum of the link channel capacity to the sum of the channel capacity of the links, and
when the sum of the channel capacity of the links is not greater than the corresponding sum of the link channel capacity when the value of the preset counting unit is t−1, setting the rank constraint of the $j^{th}$ transmitting end to the corresponding rank constraint of the $j^{th}$ transmitting end when the value of the preset counting unit is t−1, and setting the sum of the link channel capacity to the corresponding sum of the link channel capacity when the value of the preset counting unit is t−1; and
⑤ adding 1 to the value of the preset counting unit.

* * * * *